United States Patent [19]

Farrell, II

[11] Patent Number: 4,820,166

[45] Date of Patent: Apr. 11, 1989

[54] APPARATUS AND SYSTEM FOR SELECTIVELY DEFLATING TIRES, AND CAUSING POWER STEERING AND POWER BRAKE FAILURES FOR TRAINING DRIVERS

[76] Inventor: Donald A. Farrell, II, P.O. Box 306, Yucca, Ariz. 86438

[21] Appl. No.: 888,397

[22] Filed: Jul. 23, 1986

[51] Int. Cl.[4] .......................................... G09B 250/00
[52] U.S. Cl. .................................. 434/376; 137/538; 141/65; 152/415
[58] Field of Search ...................... 434/61, 62, 66, 67, 434/373, 376; 141/65; 152/415; 137/102, 516.17, 516.19, 516.21, 538

[56] References Cited

U.S. PATENT DOCUMENTS

| 122,544 | 1/1872 | Westinghouse, Jr. | 137/102 |
|---|---|---|---|
| 2,273,462 | 2/1942 | Bryan et al. | 434/376 X |
| 2,281,605 | 5/1942 | Smith | 137/102 |
| 2,610,859 | 9/1952 | Wilcox | 137/102 |
| 3,532,140 | 10/1970 | Hoffman | 152/415 X |
| 3,827,451 | 8/1974 | Roos | 137/102 |
| 3,838,717 | 10/1974 | Wolf | 141/65 |
| 3,851,658 | 12/1974 | Bunyard | 137/102 |
| 4,041,970 | 8/1977 | Peters | 137/102 |
| 4,068,690 | 1/1978 | Wyman | 141/95 |
| 4,085,772 | 4/1978 | Roger | 137/464 |
| 4,153,096 | 5/1979 | Kirk | 152/415 |

FOREIGN PATENT DOCUMENTS

| 924437 | 8/1947 | France | 137/102 |
|---|---|---|---|
| 1015552 | 10/1952 | France | 152/415 |
| 896668 | 1/1982 | U.S.S.R. | 434/373 |
| 709847 | 6/1954 | United Kingdom | 137/538 |

Primary Examiner—John E. Murtagh
Assistant Examiner—Andrew Joseph Rudy
Attorney, Agent, or Firm—Jerry R. Seiler

[57] ABSTRACT

An improved apparatus for selectively deflating and inflating a tire mounted on a wheel comprises a valve assembly rigidly and coaxially mounted on a vehicular wheel incorporating a reciprocally movable valve body received in a cavity of a valve housing, the valve body having a plurality of channels for directing gas to gas outlet ports for pressurizing the tire, the valve body moving to a first position to close off a gas exhaust port in the valve housing and a second position to open the exhaust port when pressurized gas to the valve from a pressurized gas source is terminated. The valve assembly includes a valve member movably secured on the valve body alternately opening and closing the gas directing channels as the valve body is moved between the first and second positions. In a driver education system additional power steering and power brake failure assemblies are incorporated.

15 Claims, 4 Drawing Sheets

APPARATUS AND SYSTEM FOR SELECTIVELY DEFLATING TIRES, AND CAUSING POWER STEERING AND POWER BRAKE FAILURES FOR TRAINING DRIVERS

BACKGROUND OF THE INVENTION

The need for systems and apparatus for improving driver education, particularly for drivers of trucks, public transportation vehicles, fire trucks, ambulances, and police cars is readily apparent. Insurance companies provide favorable insurance rates for governmental agencies whose drivers have taken training in handling vehicular emergencies and breakdowns including tire blowouts and other critical vehicular malfunctions.

In U.S. Pat. Nos. 3,532,140 and 3,838,717 tire blowout simulators for vehicles are disclosed. In the earlier patent, a reciprocating valve arrangement is secured to the lug nuts of a wheel rather than being independently mounted. Moreover, the design of the valve does not provide for rapid inflation of the tire. In the later patent, the valve includes a diaphragm which is susceptible to malfunction should dirt particles or other contamination become lodged between the diaphragm and the valve sealing surface. The device is mounted on the wheel using flexible hoses resulting in vibration at high speeds and substantially prevents effective wheel balancing.

It is to the elimination of design disadvantages of such prior art devices that the valve of the present invention is directed.

SUMMARY OF THE INVENTION

The present invention is directed to an improved valve assembly for selectively deflating and inflating a vehicular tire for driver training. The improved valve design allows the tire to be inflated rapidly after it has been deflated. In addition, the unique design of the valve of the invention provides for coaxial mounting relative to the wheel so that it is well balanced on the wheel regardless of the vehicle speed. The valve is securely mounted on the wheel without interference with or use of the wheel lug nuts so that the wheel can be readily removed and the lug nuts reached without removing or otherwise disturbing the valve. The unique valve assembly also incorporates a self-cleaning feature during deflation.

In a preferred embodiment the valve assembly is also used in a driver training system which includes a power steering failure assembly and a power brake failure assembly, all of which will be described in more detail hereinafter.

DETAILED DESCRIPTION OF THE INVENTION

Figure 1:
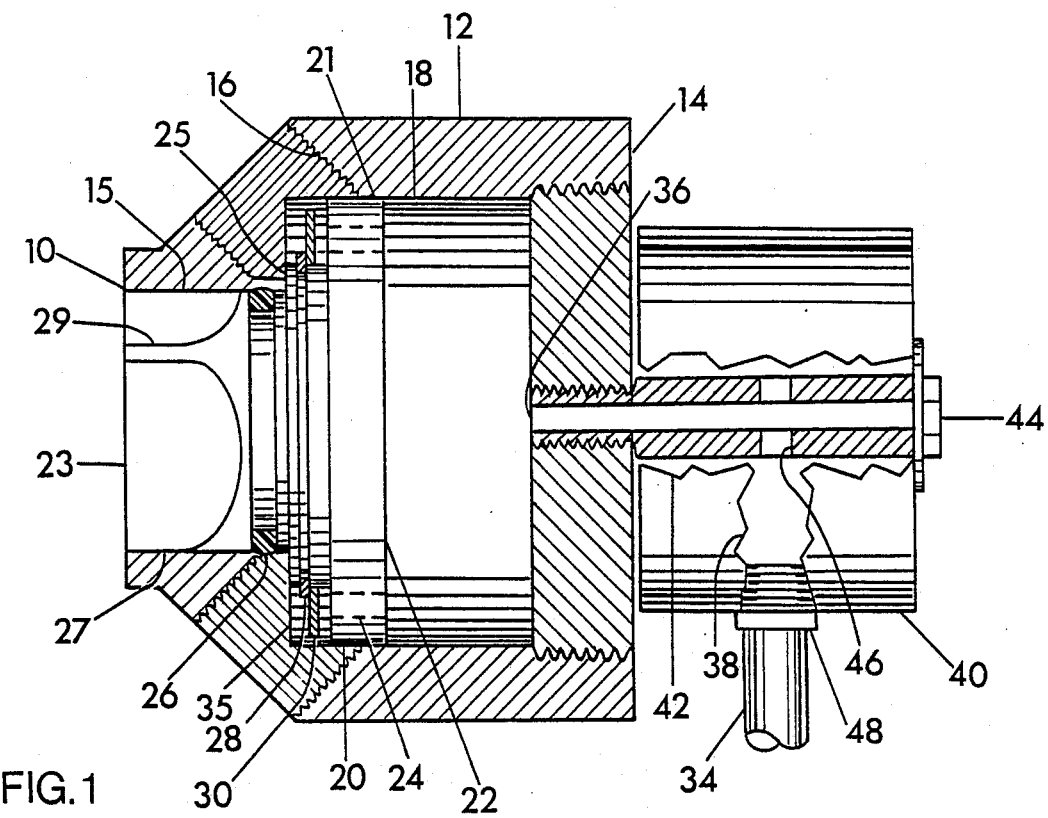
FIGS. 1 and 2 are views of the valve assembly partially in section, showing the valve body in a first position for pressurizing a tire and a second position for deflating a tire, respectively.
Figure 2:
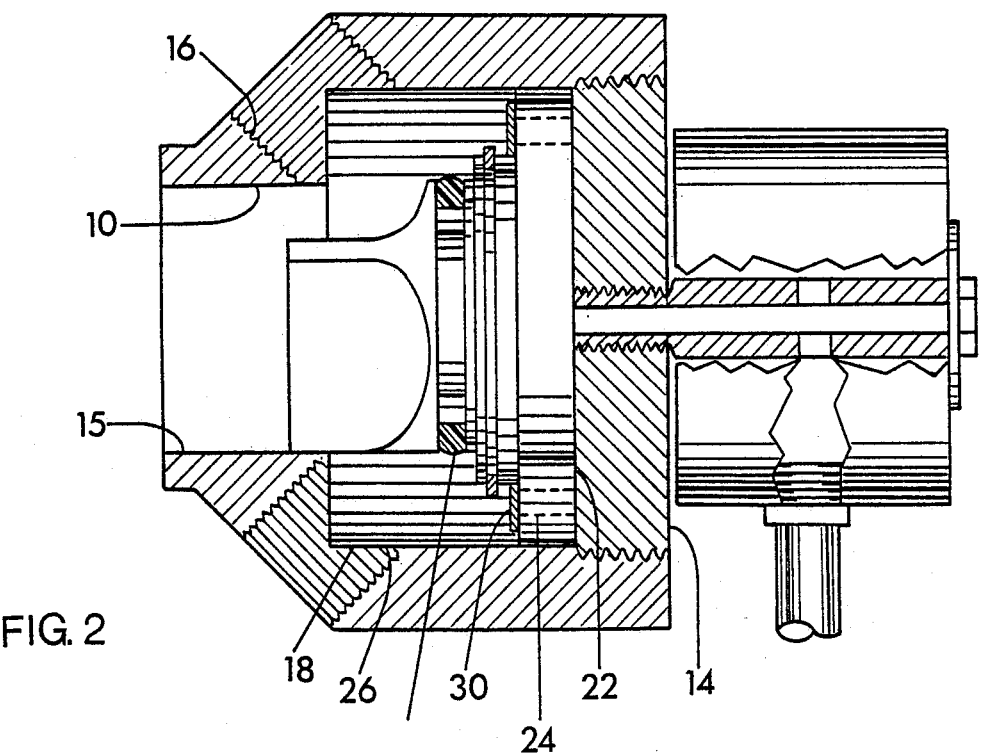

In FIGS. 1 and 2 the components of the improved tire deflating and inflating valve assembly of the invention are shown. The valve assembly includes a valve housing 12, shown in section, having a cylindrical cavity 18 in which a reciprocally movable valve body 20 is received. The valve body is reciprocally movable between a first position illustrated in FIG. 1 in which a tire is inflated and maintained at a desired air pressure, and a second position shown in FIG. 2 in which the tire is deflated. The valve body includes a piston plate 21 at one end thereof having a plurality of channels 24 (shown in phantom) extending through the plate. These channels direct gas from a pressurized gas source through the plate. A plurality of outlet ports 16 direct gas from the valve to a tire. The valve housing also includes an exhaust port 10 at one end with a cap 14 secured to enclose the cavity 18.

Valve body 20 is also provided with a sealing means preferably in the form of an O-ring 26 which forms a gas seal at exhaust port 10 when the valve body is in a first position shown in FIG. 1. A movable gasket 30 is also secured on the valve body by a retaining clip 28. Gasket 30 moves between a first position shown in FIG. 1 in which gas directing channels 24 are open so that gas may pass through piston plate 21, and a second position illustrated in FIG. 2 in which the gasket closes the channels. The gasket, o-ring and retaining clip are shown in section.

Secured to cap 14 is a rotary union assembly 40 which incorporates suitable bearings and other means for allowing the valve housing to rotate rapidly relative to the rotary union which itself remains stationary. The rotary union construction itself is not part of the invention and will be understood by those skilled in the art. The rotary union is modified for adaption to the valve assembly of the present invention by incorporating a hollow bolt 42 which threadedly engages cap 14, both shown in section, and is provided with a channel 38 into which is threadedly secured fitting 48 and hose 34 for directing pressurized gas from a pressurized gas source into the valve assembly. Cap 14 includes an inlet port 36 and hollow bolt 42 is threadedly secured into the cap axially with inlet port 36. Channel 38 communicates with orifice 46 extending into hollow bolt 42. Cap 14 may be secured to the valve housing threaded engagement, as shown or by other suitable means.

Figure 3:
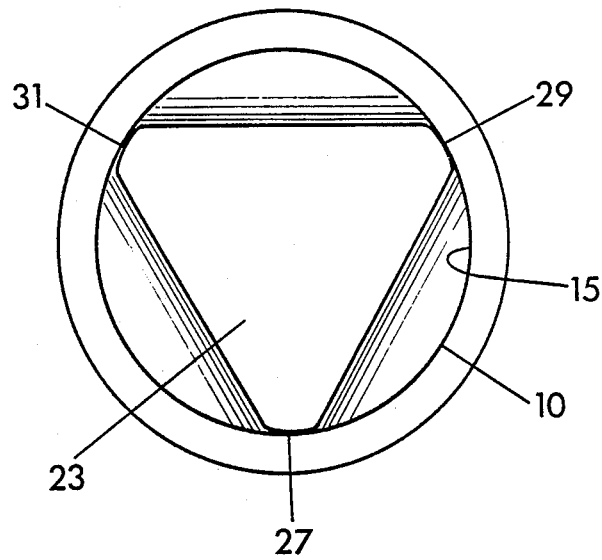
FIG. 3 is a partial front view showing the relationship of the valve body and the guide channel of the valve housing.

The relationship of the valve body and valve housing is also an important feature of the invention. Observing FIGS. 1-3, valve body 20 is provided with valve guide means at one end in the form of valve guide surfaces 27, 29 and 31 extending parallel to one another along the axis of valve body movement and uniformly spaced apart. These guide surfaces slide along the axis of cylindrical valve guide channel 27 and maintain slidable engagement with the circumferential wall thereof to stabilize the valve body as it travels reciprocally between the positions shown in FIGS. 1 and 2 during operation. Moreover, in such reciprocal movement between the two extreme positions, some portion of the guide members remain in contact with the guide channel. By providing the valve body with such guide surfaces which cooperate with a guide channel formed in the valve housing, the need to use slots, pins, splines, etc. which would otherwise be required to achieve reliable operation, is avoided. Moreover, because the guide means, i.e., the guide channel and guide surfaces, are exteriorly accessible, they may be readily inspected, and if necessary, cleaned, without opening the valve housing. Also, because of the relationship of the preferred cylindrical guide channel shown and the valve body guide members operational guide stability is provided regardless of the valve body rotation. Although the valve body shown is provided with three parallel guide surfaces, more may be used. Thus, for example, where four or five of such guide surfaces are used, they are uniformly spaced to form a generally square or pentagonal shaped valve body end surface 23, respectively, rather than the triangular shape shown in FIG. 3.

Figure 4:
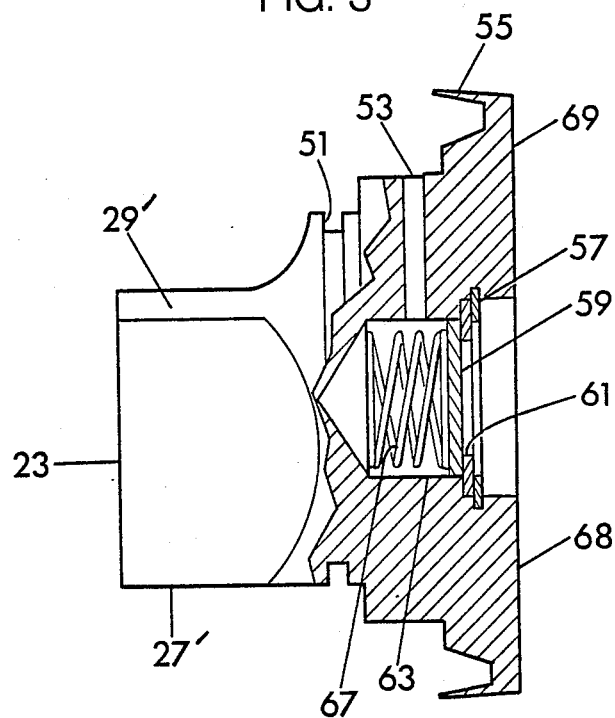
FIG. 4 is a partial sectional view of a second valve body embodiment.

In FIG. 4 is shown another valve body embodiment. The same guide means in the form of three guide surfaces (27' and 29' shown) are used as is an O-ring slot 51 for receiving an O-ring illustrated in the valve of FIGS. 1 and 2. The valve body 68 incorporates a one-way check valve 59 urged against valve seat 61 by spring 67. A ball check valve or a wafer-type valve, as shown, or other equivalent may be used. A retaining ring 57 may be provided to support the valve seat in position. One or more gas inlet conduits 53 are formed in the valve body and communicate with gas inlet cavity 63 behind the check valve. In the preferred embodiment shown, the valve body is made from structural synthetic resins such as epoxy resins, fluoroplastics (poly TFE and FEP), phenolics, nylon, polypropylene, etc. The valve body preferably incorporates a flexible feathered edge or flange 55, having a slightly greater diameter than that of the piston plate surface 69 or the interior cylindrical surface of the valve housing cavity 18 (FIG. 1) to form a gas-tight seal. Such a valve body also has the advantages of being relatively lightweight and self-lubricating.

Figure 5:
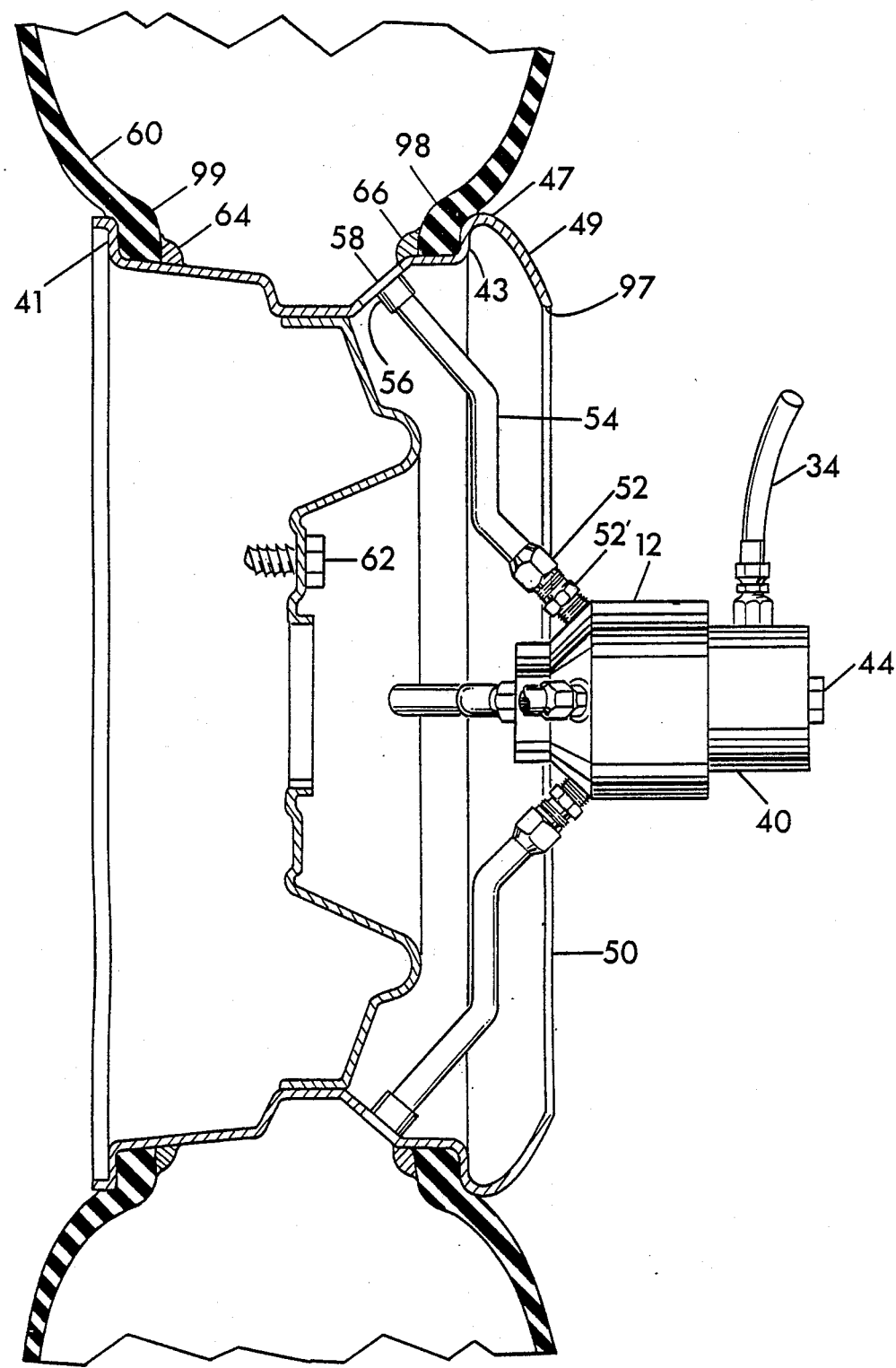
FIG. 5 is a sectional view of a vehicular wheel and portion of a tire illustrating the valve assembly secured thereto.

In describing the operation of the valve of the invention, reference is made to FIGS. 1 and 2 and to FIG. 5 illustrating the valve assembly secured on a wheel. The vehicle to which the valve assembly of the invention is operably connected will include a pressurized gas cylinder or tank connected to supply hose 34 and a regulator valve or the like located along the supply hose. When demand for pressurized gas to the tire is desired by an operator, the regulator valve will be opened and pressurized air will be directed to the valve assembly of the invention via hose 34 through channel 38, through hollow bolt 42 and inlet port 36 and against the enlarged surface 22 of piston plate 21, forcing the valve body in the direction of exhaust port 10 until shoulder 25 is stopped against bottom surface 35 of cavity 18. In this position O-ring 26 is in gas sealing engagement with the walls of exhaust port 10 so that no gas leaks through that port. As also shown in FIG. 1, gasket 30 is forced toward exhaust port 10 to open channels 24. The pressurized gas thus flows through these channels into the plurality of outlet ports 16, through the plurality of rigid pipes 54 and into the tire body. The tire will continue to be inflated until the pressure is equalized when a preselected pressure setting has been reached.

When it is desired to deflate the tire to simulate a blowout or lower the tire pressure to cause a low or flat tire, the operator causes gas pressure in the gas supply hose 34 to be reduced below the pressure of the gas in the tire, for example, by terminating gas supplied from the gas tank such as closing the regulator valve and releasing gas pressure in the supply hose. A separated by-pass or pressure release valve may be used for this purpose. As the pressure in the gas supply hose and cavity 18 is reduced below the pressure in the tire, valve body 20 is urged away from exhaust port 10 until top plate surface 22 of the valve body stops against cap 14 as shown in FIG. 2. As O-ring 26 is unseated from gas sealing engagement in exhaust port 10, pressurized gas in the tire exhausts via rigid pipes 54, outlet ports 16 and through exhaust port 10. In the valve position of FIG. 2, gasket 30 has been forced to close channels 24.

The valve body assembly is secured to vehicular wheel 50 using a plurality of rigid pipes 54 and swivel fittings 52 engaging threaded fittings 52' secured to outlet ports 16 of the valve housing which extend at a 45° angle from the axis of the valve as shown allowing the valve to be detached and removed without removing or flexing pipes 54. A flared fitting 52 as shown is preferred although other fittings including O-ringed or flat flanged tubing may be used. Fittings 56 secure the opposite end of the pipes into ports 58 in the wheel. The valve assembly is rigidly mounted coaxially with the wheel so that the wheel may be balanced with the valve for operation at high or low speeds. Moreover, because the rigid pipes are mounted independently of the wheel lug nuts 62, the wheel may be mounted or removed without removing the valve assembly.

The operation of the valve, substituting valve body 68 of FIG. 4 for valve body 20 of FIGS. 1 and 2 is similar, but without requiring a gasket 30 which somewhat interrupts air flow to and from outlet ports 16. When the tire is to be inflated, gas pressure from the gas supply source will move the valve body to the forward position shown in FIG. 1. The gas pressure also urges one-way check valve 59 away from valve seat 61 and gas passes through the valve into cavity 63 and through gas inlet conduit 53. From there the gas will pass through gas outlet ports 16 and inflate the tire until the preselected tire pressure is achieved. As pressure on both sides of the check valves is approximately equal, spring 67 will cause the check valve to close. To deflate the tire, operation will be substantially like that described regarding FIG. 2.

In FIG. 5, there is also illustrated a preferred wheel embodiment for improving the performance of a vehicle incorporating the tire deflating valve assembly of the invention. An improved wheel 50 includes a modified outside rim portion 49 and inside and outside tire-retaining moldings 64 and 66, respectively. The tire-retaining moldings 64 and 66 comprise metallic bands or beads secured circumferentially around the wheel adjacent inside and outside rim flanges 41 and 43, respectively. The moldings are spaced from the rim flanges to provide room for the inside and outside tire beads 99 and 98, respectively. The moldings abut the tire beads and prevent them from becoming displaced relative to the rim flanges when the tires are deflated as the vehicle is being operated in a manner as previously described. Thus, the presence of such a molding prevents the tire bead displacement and avoids loss of the tire bead seal with the rim and rim flanges. The molding may be secured by any convenient means, preferably by being welded to the wheel.

In another preferred embodiment shown in FIG. 5, wheel 50 is provided with a modified outside rim portion 49. Such a modified rim includes an arch or radius portion 47 extending from outside rim flange 43 generally normal to and away from the axis of rotation of wheel 50. In the preferred embodiment, outside rim portion 49 extends from arch 47 inwardly toward the wheel axis terminating in an outside rim edge 97 having a diameter smaller than the inside diameter of a tire secured to the wheel, or the nominal wheel diameter. The purpose of such a modified rim is to provide an outside rim configuration which will not dig in to the ground or soft pavement surface, such as an asphaltic concrete pavement, when the tire is deflated during operation as previously described. The rim modification as shown will also cause the tire to remain in a more rounded condition when deflated as the vehicle is moving without injury to the tire or to a pavement surface. The modified rim may also be used on the inside rim.

Figure 6:
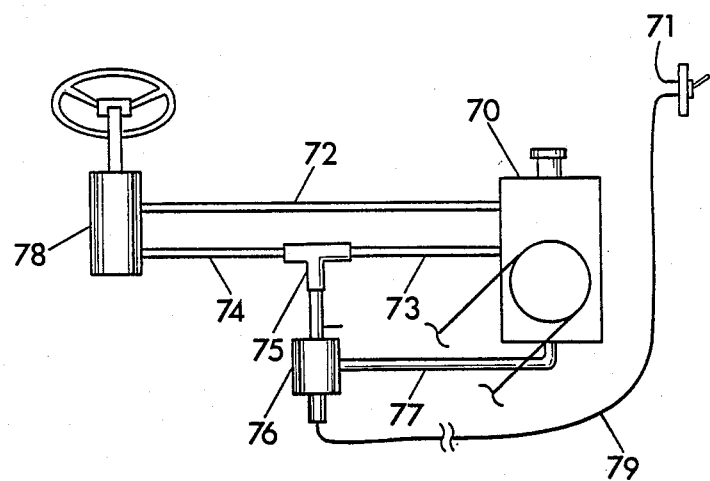
FIG. 6 is a schematic view showing a power steering failure assembly of the invention.
Figure 7:
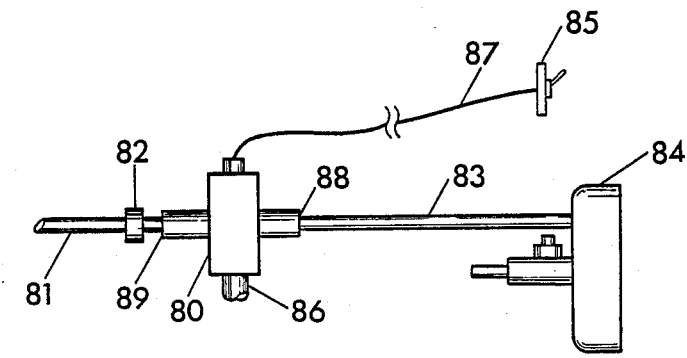
FIG. 7 is a schematic view illustrating a power brake failure assembly of the invention.

In FIGS. 6 and 7 there are illustrated a power steering failure assembly and a power brake failure assembly, respectively, which may be used together with the previously described tire deflating and inflating valve assembly for a driver training system. Alternatively, these power steering and power brake failure systems may be used independently. When used in a combined system, the three assembly components together provide a highly advantageous means for driver training creating the most commonly occurring vehicular failures encountered during operation of the vehicle.

The power steering failure assembly shown in FIG. 6 comprises a fluid-diverting fitting 75 installed along the power steering supply conduit which extends between power steering pump 70 and steering control box 78. The conduit may be cut and fitting 75 secured between the conduit or hose portions 73 and 74. Fitting 75 is a three channel fitting or T-fitting with the ends of hose portions 73 and 74 connected to two of the fitting ports and another hose portion 65 connected to the third fitting port A valve 76 is connected between fitting 75 and power steering pump, the valve being connected to the opposite end of hose portion 65 and by-pass hose 77 which extends between the valve and the power steering pump. The valve is electrically connected to a control panel 71 via suitable electrical wires 79. A return conduit or hose 72 connecting steering control box 78 and power steering pump 70 returns the fluid to the pump.

In normal power steering operation, valve 76 is in a closed condition so that pump 70 directs power steering fluid to the steering control box 78 via T-fitting 75 and hose portions 73 and 74. When it is desired to create a power steering failure, an operator actuates a switch or lever on control panel 71 opening valve 76 whereby power steering fluid is diverted through the now open valve via T-fitting 75 through by-pass hose 77. In this condition, a substantial amount of power steering fluid is pumped through open valve 76 and does not reach steering control box 78 thus affecting the normal power steering function and requiring the driver to respond to the power steering failure condition. When it is desired to return to normal power steering, an operator simply switches valve 76 closed.

In the power brake failure assembly shown in FIG. 7, a valve 80 is installed along the vacuum hose which supplies the vacuum assist from a vacuum source in an automobile engine to brake master cylinder 84. Thus, the vacuum hose 81 is cut and valve 80 is connected to the hose at one port 89 while the other portion 83 of the vacuum hose is connected to another port 88 of the valve. The valve is electrically connected via wire 87 to a control panel 85. The valve includes a vent 86 or similar opening for opening the valve to atmosphere to defeat the vacuum in the vacuum hose when desired. A one-way check valve 82 is also connected along vacuum hose 81 between the vacuum source and valve 80. The check valve allows air to pass in a direction from valve 80 toward the vacuum source thereby preventing pressure build-up in the opposite direction. Normally such a check valve is present along the vacuum hose adjacent master cylinder 84 so as to prevent back pressure from defeating the power assist. When the modification is made to install the power brake failure assembly shown, the check valve is removed from its normal location and placed in the position shown on the vacuum source side of valve 80. In normal operation, valve 80 will be open so that a vacuum is created along vacuum hose portions 81 and 83 thereby providing the power assist necessary on master cylinder 84. When it is desired to defeat the power brake assist, an operator actuates a switch located on control panel 85 thereby closing the valve and opening vent 86 defeating the vacuum along vacuum hose portion 83. In this condition, the power brake assist mechanism is defeated requiring a driver to respond to such a condition.

Figure 8:
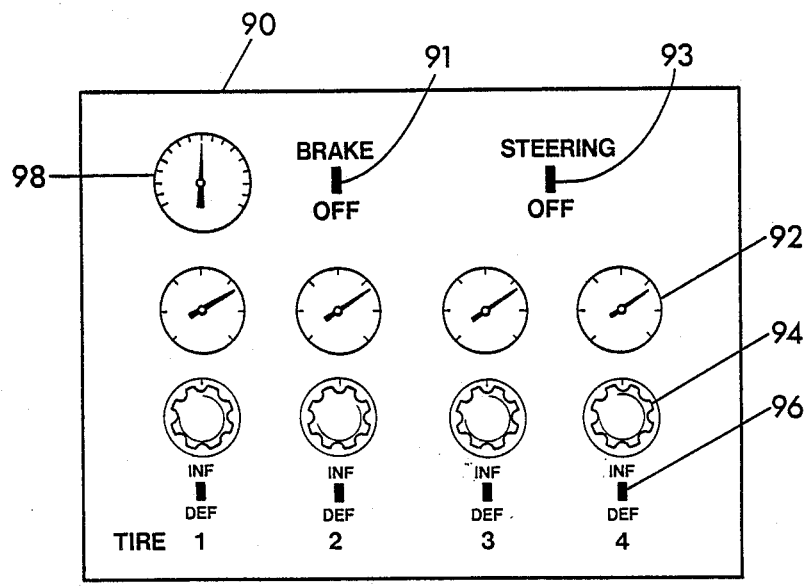
FIG. 8 shows a control panel for a system incorporating the devices of the invention.

In FIG. 8 there is illustrated an example of a control panel which may be utilized in a vehicle system for selectively causing a blowout, or a low or flat tire, power steering failure and power brake failure utilizing the assemblies previously described. Control panel 90 includes a power brake defeating toggle switch 91, a power steering failure toggle switch 93 and a plurality of tire deflating switches 96. Preferably, the system includes four of such switches, one for each tire on the vehicle as well as a regulator valve for each one of the tires. In the preferred embodiment, a different valve is used for each tire. Knob 94 is used for opening and closing a regulator valve for inflating a tire to the desired pressure. Each regulator valve includes a pressure gauge 92 so that the operator can observe the pressure condition of a tire. When greater pressure is desired, knob 94 may be adjusted and pressure from an air pressure tank as previously described will inflate the tire. When it is desired to suddenly deflate the tire, switch 96 is actuated causing pressure in gas supply hose 34 shown in FIGS. 1, 2 and 5 to be released, resulting in rapid deflation of the tire as previously described. The individual tire regulator valve may be adjusted to achieve any desired tire pressure for each of the respective tires. Moreover, a tire may be deflated to a low pressure condition without simulating a blowout, if desired, by simply selecting the low pressure desired, and initiating deflation. When the preselected tire pressure is achieved, and pressure on both sides of the valve equalized, the valve will close to prevent further air from being exhausted from the tire. The panel may also include pressure gauge 98 showing the pressure in the air pressure supply tank. With such a control panel, an operator can select the desired condition to be reacted to by the driver during a training session. Other components and modifications within the purview of the invention will be evident to those skilled in the art.

I claim:

1. In an apparatus for selectively deflating and inflating a wheel mounted tire, an improved valve assembly comprising:
    (a) a valve housing member having a cavity therein, a gas inlet port adjacent a first end of said cavity, an exhaust port adjacent a second end of said cavity opposite said first end, a hollow cylindrical guide channel extending between said cavity and said exhaust port, and a plurality of gas outlet ports communicating with said cavity intermediate said gas inlet and exhaust port, (b) a valve body received in said cavity having a piston plate at one end thereof, said plate having a first surface exposed to said gas inlet port, a second surface exposed to said gas outlet ports, gas directing channel means communicating between said first and second surfaces, said valve body being reciprocally movable in said valve housing cavity between a first position wherein said gas exhaust port is closed and a second position wherein said gas exhaust port is open, said valve body having a guide member formed thereon opposite said piston plate and extending into said guide channel said guide member having a plurality of guide surfaces slidably engaging said guide channel in said first and said second positions, (c) a gas sealing member cooperating with said valve body for forming a gas-tight seal between said gas exhaust port and said cavity when said valve body is in said first position, and (d) a one-way valve member movably secured on said valve body for alternately opening and closing said gas directing channel means when said valve body is in said first and second positions, respectively.

2. The apparatus of claim 1 wherein said valve member comprises an annular washer.

3. The apparatus of claim 1 wherein said guide surfaces are parallel and elongated and extend lengthwise along the axis of said valve body reciprocal movement.

4. The apparatus of claim 3 wherein said valve body comprising a synthetic resin and includes a feathered flexible flange adjacent said piston plate and extending entirely around said valve body and urged against the surface of said cavity and forming a gas seal therewith.

5. The apparatus of claim 4 wherein said valve member comprises a one-way valve.

6. The apparatus of claim 1 wherein said valve body comprises a synthetic resin.

7. The apparatus of claim 6 wherein said valve body includes a feathered flange adjacent said piston plate forming a moving gas seal along a surface of said cavity of said valve housing member.

8. The apparatus of claim 1 including a vehicular wheel having a plurality of wheel ports communicating interiorly of said wheel, an inflatable tire mounted thereon, a plurality of rigid conduits having one end secured to said wheel at one of said wheel ports and an opposite end secured to said valve housing at one said gas outlet ports, said valve assembly being coaxially supported on said wheel by said rigid conduits.

9. The apparatus of claim 8 including a rotary union device coaxially secured on said valve housing, a source of compressed gas, and a gas hose secured between said gas source and said rotary union device whereby gas may be selectively delivered to said wheel from said gas source through said valve assembly.

10. The apparatus of claim 9 including valve means secured along said gas hose between said gas source and said rotary union device for selectively terminating pressurized gas to said valve assembly whereby said valve body moves to said second position to deflate said tire.

11. The apparatus of claim 10 wherein said valve means includes a regulator valve for selectively pressurizing and depressurizing said tire.

12. In a vehicle a system for selectively causing a flat tire, power steering failure and power brake failure comprising (a) an apparatus of claim 10, (b) a power steering failure assembly comprising a fluid diverting fitting secured in a power steering fluid supply line extending between a power steering pump and steering box, a fluid directing conduit extending between said fitting and said power steering pump, and a first electrically operated valve operatively secured along said conduit for selectively opening and closing said conduit, (c) a power brake failure assembly comprising a second electrically operated valve operatively secured along a vacuum hose between a vacuum source and a master brake cylinder, said second valve having means for opening said vacuum hose to atmosphere, and a gas check valve operatively secured along said vacuum hose between said vacuum source and said second valve for preventing exposure of said vacuum source to atmosphere when said second valve is open to atmosphere, and (d) an operations panel having first and second switching means electrically connected to said first and second electrically operated valves, respectively, for selectively operating said valves, and third switching means operatively connected to said valve means for selectively terminating pressurized gas to said valve assembly.

13. The system of claim 12 wherein said valve means includes a regulator valve for selectively pressurizing and depressurizing said tire.

14. The system of claim 13 including four of said apparatus for selectively deflating and inflating different tires of a vehicle and wherein said operations panel includes individual third switching means operatively connected to different valve means for selectively pressurizing and depressurizing one or more selected tires.

15. The apparatus of claim 1 wherein said guide member is shaped to provide a gas outlet passageway between said guide channel and said guide member engaged therein.

* * * * *